US008856309B1

(12) United States Patent
Vazquez et al.

(10) Patent No.: US 8,856,309 B1
(45) Date of Patent: Oct. 7, 2014

(54) STATISTICAL TOOL FOR USE IN NETWORKED COMPUTER PLATFORMS

(75) Inventors: Pedro Vazquez, Grenoble (FR); James Weir, Grenoble (FR); Laurent Ganne, St. Martin d'Heres (FR)

(73) Assignee: Oracle America, Inc., Redwood City, CA (US)

( * ) Notice: Subject to any disclaimer, the term of this patent is extended or adjusted under 35 U.S.C. 154(b) by 2376 days.

(21) Appl. No.: 11/081,633

(22) Filed: Mar. 17, 2005

(51) Int. Cl.
*G06F 15/173* (2006.01)

(52) U.S. Cl.
USPC .......................... 709/224; 709/217; 709/219

(58) Field of Classification Search
USPC .................... 709/201, 202, 203, 224, 218
See application file for complete search history.

(56) References Cited

U.S. PATENT DOCUMENTS

| | | | |
|---|---|---|---|
| 6,470,388 B1 * | 10/2002 | Niemi et al. ................... | 709/224 |
| 6,975,595 B2 * | 12/2005 | Peterson ........................ | 370/252 |
| 2002/0156884 A1 * | 10/2002 | Bertram et al. ............... | 709/224 |
| 2004/0078461 A1 * | 4/2004 | Bendich et al. ............... | 709/224 |
| 2005/0015773 A1 * | 1/2005 | Gorman et al. ............... | 719/310 |
| 2005/0065753 A1 * | 3/2005 | Bigus et al. ................... | 702/186 |
| 2006/0150158 A1 * | 7/2006 | Fellenstein et al. ........... | 717/126 |
| 2006/0179059 A1 * | 8/2006 | Reed et al. ..................... | 707/10 |
| 2009/0070462 A1 * | 3/2009 | Chong et al. .................. | 709/224 |

\* cited by examiner

*Primary Examiner* — Derrick Ferris
*Assistant Examiner* — Scott M Sciacca
(74) *Attorney, Agent, or Firm* — Marsh Fischmann & Breyfogle, LLP; Jonathon A. Szumny; Kent A. Lembke

(57) ABSTRACT

A statistic tool is provided for use in relation with a group of nodes in which each node has a statistic server configured to maintain application-related statistical data on local execution in the node. The statistic tool comprises a statistic manager for storing centralized statistical data obtained from the nodes and an intermediary server for processing a request from another computer system concerning the execution of an application by gathering statistical data received from those of the nodes that intervene in the execution of the application.

20 Claims, 3 Drawing Sheets

US 8,856,309 B1

STATISTICAL TOOL FOR USE IN NETWORKED COMPUTER PLATFORMS

COPYRIGHT NOTICE

A portion of the disclosure of this patent document contains material which may be subject to copyright protection. The copyright owner has no objection to the facsimile reproduction by anyone of the patent document or the patent disclosure, as it appears in the Patent and Trademark Office patent file or records, but otherwise reserves all copyright and/or author's rights whatsoever.

TECHNICAL FIELD

The present invention generally relates to distributed computer systems, and, more particularly, to systems and methods for monitoring a plurality of nodes within a distributed system.

BACKGROUND

Distributed systems have become more complex in today's ever-expanding global computing environment. Distributed systems provide a collection of independent nodes that process tasks in such a way that they appear transparent to the user so that it appears to the user that all the processing is performed on one local machine. These systems present characteristics like distribution, failover tasks, switchover tasks, etc that must be measured. As a consequence, traditional tools for application profiling and measuring system performance are inadequate for these complex systems.

Therefore, there is a need in the art of distributed systems to provide mechanisms to profile applications and measure performance of distributed systems.

SUMMARY

One embodiment consistent with the present invention relates to a method of monitoring a plurality of nodes. The method comprises the steps of providing at least some of the nodes with a statistical server that maintains application-related statistical data on local activity in the node; storing centralized statistical data obtained from the nodes, and providing an intermediary server to process an incoming request concerning the execution of an application by gathering statistical data received from those of the nodes that intervene in the execution of the application.

In accordance with another aspect of the present invention, a statistic tool is provided for use in relation with a group of nodes in which each node has a statistic server configured to maintain application-related statistical data on local execution in the node. The statistic tool comprises a statistic manager for storing centralized statistical data obtained from the nodes and an intermediary server for processing a request from another computer system concerning the execution of an application by gathering statistical data received from those of the nodes that intervene in the execution of the application.

In accordance with another aspect of the invention, a networked computer system is provided that comprises a group of nodes, wherein at least some of the nodes have a statistical server configured to maintain application-related statistical data on local execution in the node and of communicating the same to another node.

In accordance with yet another aspect of the invention, a statistical server for use in a node is provided. The statistical server comprises a statistic server configured to maintain application-related statistical data on local execution in the node and a reporter configured to retrieve statistical data from the statistic server.

Embodiments of the invention may also be defined as an apparatus or system, and/or as software code for implementing the method, or for use in the system, and/or as portions of such software code, in all their alternative embodiments to be described hereinafter.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

DETAILED DESCRIPTION

Figure 1:
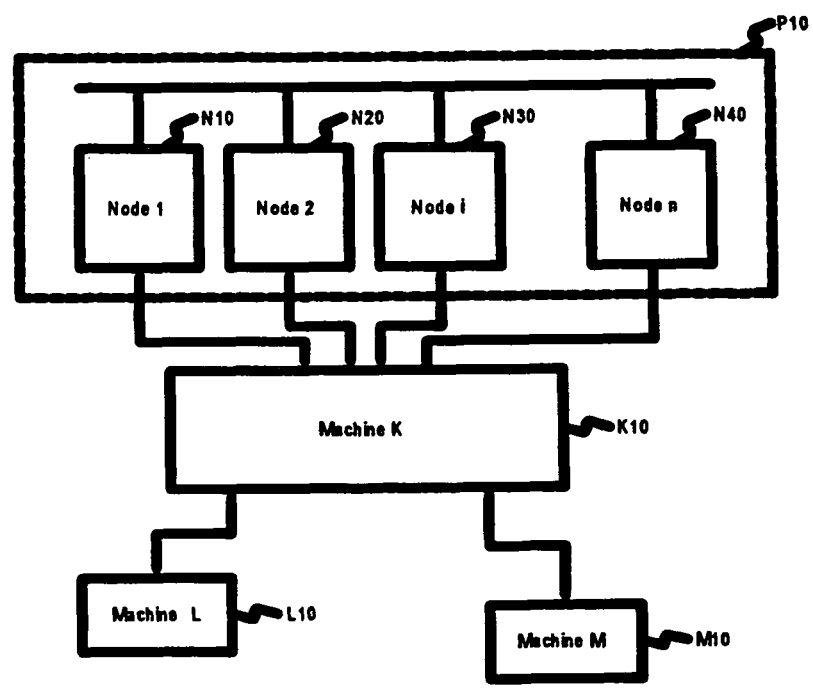
FIG. 1 is an exemplary schematic illustrating a networked computing system in accordance with an embodiment of the present invention.

Reference will now be made in detail to exemplary embodiments consistent with the invention, examples of which are illustrated in the accompanying drawings. Wherever possible, the same reference numbers will be used throughout the drawings to refer to the same or like parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering or adding steps to the disclosed methods. Accordingly, the following detailed description does not limit the invention.

As they may be cited in this specification, Sun, Sun Microsystems and Sun One are trademarks of Sun Microsystems, Inc.

FIG. 1 is an exemplary schematic illustrating a networked computer system comprising a computer Platform P10 providing an extensible distributed software environment, which may be intended for managing and controlling applications running within components of the computer.

In an embodiment, the computer platform may be a High Availability Platform (HA platform), as used in real time non-stop computer networks.

Platform P10 may be composed of a plurality of interconnected cooperating nodes, for example Node N10, Node N20 Node N30 and Node N40.

The expression Node i may also be used generically to designate any one of the nodes of Platform P10. Thus, the suffix or index i may take any of the values: $\{1, 2 \ldots n\}$, n being the number of nodes in the Platform P10. In FIG. 1, n is equal to 4 and Node i is shown as being N30, for convenience.

Platform P10 may form a distribution environment enabling task switching. This means that a task or service can be initially provided by an application in a given node, e.g., Node 1, and that service later can be continued through another instance of the same application, however running in another node, e.g., Node i.

Each node of Platform P10 may be connected to another machine K10, generically denoted Machine K in short. In this embodiment, Machine K10 does not form part of Platform P10.

Machine K10 may be connected to a plurality of user machines, for example a machine L10 and a machine M10, which are outside Platform P10. User machines are generically denoted as Machine L and Machine M.

It is of interest to provide user machines outside Platform P10, e.g., machines L10 and M10, with different types of statistics:

statistical application information, captured from applications running on Platform P10, and statistical system information, related to Platform P10 nodes themselves.

Figure 2:
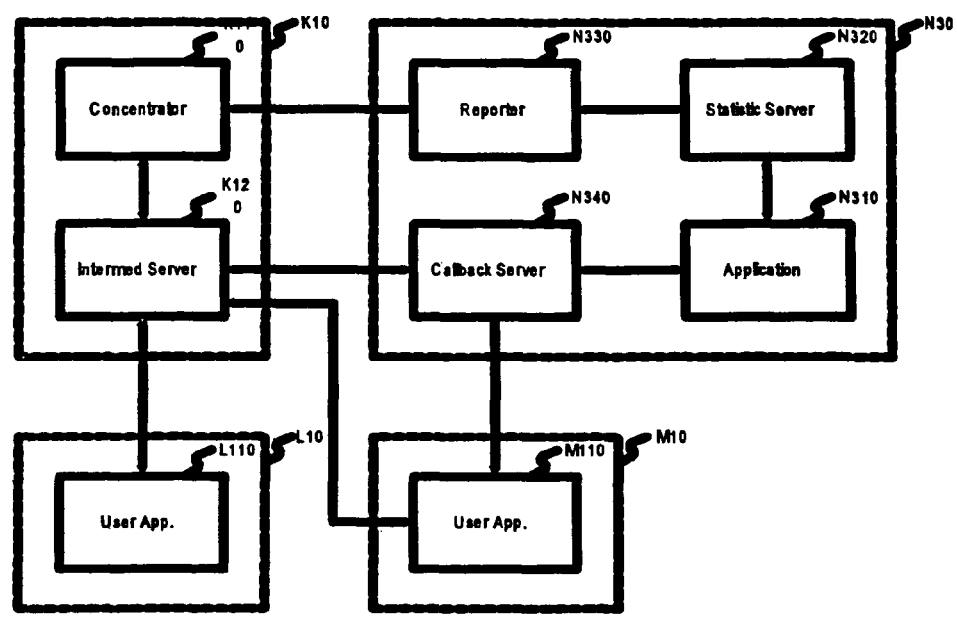
FIG. 2 is an exemplary schematic illustrating with more details a portion of FIG. 1.

FIG. 2 is a more detailed exemplary schematic of the computer system of FIG. 1, in which only Node i (e.g., N30) has been represented for simplification purposes. Node i N30 is capable of locally executing an application (software) N310 and/or of locally continuing an application which has started in a different node of Platform P10, e.g., Node N20.

Node i is running a Statistic Server N320, such as a local statistic agent, capable of gathering statistical information on applications running on Node i N30, e.g., application N310, and storing the same. For example, statistic server N320 may gather statistical information regarding counters and blocks. Counters can be used to count anything a user requires, e.g., the number of messages sent during the execution of application N310 or the number of checkpoints (i.e., execution points of interest) read by application N310. Blocks can store profiling information for a block of code within application N310 by having a starting and an ending point within the code. This profiling information can include the number of times the block of code is executed or the total amount of time the block of code has been executed.

Node i N30 is also running a so-called "Reporter" N330, capable of gathering statistical information from the Statistic Server N320, and sending such statistical information to Machine K (K10) outside the Platform P10, at a selected periodicity (not necessarily exactly periodical). It will be understood that such a Reporter N330 should be launched on each Node i that contains a Statistics Server like N320. In other words, Reporter N330 works as a local statistic sender. Reporter N330 and Statistic Server N320 together can be considered as a Statistical Server.

Machine K (K10) is running a Concentrator K110, capable of collecting the statistical information from the Statistic Servers running on each Node of Platform P10 through their respective Reporters running on each Node. In particular, Concentrator K110 running on the Machine K10 is capable of collecting the statistical information from Statistic Server N320 running on Node i N30, with the statistical information being related to Application N310 in the example. Thus, Concentrator K110 may be considered as a global statistic collector.

Only one Concentrator K110 needs to be launched outside of the Platform P10. Reporter N330 and Concentrator K110 work together as a statistic manager, capable of centralizing statistical data obtained from the nodes.

Machine K (K10) is also running an Intermediary ("Intermed") Server K120 comprising a collection of services capable of retrieving statistical information stored in Concentrator K110. Intermed Server K120 is capable to process a request for statistical information, e.g., in the form of a Request Message sent using UDP sockets, i.e., a request for a requested service corresponding with the statistical information. Thus the Intermed Server K120 may be considered as a global statistic server. In this embodiment, a Request Message related to a particular statistical information includes at least:

1. A requested service name, which is the name of the service capable of retrieving the particular statistical information.

2. An execution rate (or frequency), defining the execution frequency of the requested service.

3. A destination address, defining the address of an application to which the reply will be sent.

The reply to such a Request Message may be sent to the application defined by the destination address in the form of a Reply Message using UDP sockets.

If the statistical information, as requested by the Request Message, is stored on Concentrator K110, Intermed Server K120 spawns a child process to deal with this request, i.e., with the proper requested service. The child process will operate at the execution rate or frequency defined in the Request Message, to fetch the required statistical information from Concentrator K110, and send the same to the desired user application defined by the destination address, for example User Application M110 running on Machine M (M10).

It should be noted that a Request Message may further comprise any input information, as required by the requested service.

A Request Message may be emitted from an user application running on a machine outside Platform P10, for example from User Application L110 running on Machine L L10.

Referring to FIG. 2, Node i N30 may be provided with a Callback Server N340, which provides a collection of services capable of retrieving statistical system information on Node i N30. The statistical system information may include for example memory usage or CPU usage. In other words, Callback Server N340 is a local system agent. It is also possible to create new services and let Callback Server N340 execute these services on request.

Callback Server N340 is able to process a request for statistical system information, for example, to process a request for a corresponding service. This request can request to start a service (i.e., begin receiving information about a particular node), request to stop a service (i.e., stop receiving information about a particular node), or getting the types of information that can be retrieved from a node (for example, getting all the services Callback Server N340 provides). A request for statistical system information is requested in the form of a Request Message using UDP sockets. A Request Message related to a particular statistical system information includes at least:

1. A requested service name, which is the name of the service capable of retrieving the particular statistical system information.

2. An execution rate (or frequency), defining the execution frequency of the requested service.

3. A destination address, defining the address of an application to which to send the reply.

It should be noted that a Request Message may further comprise any input information required by the requested service.

Upon receipt of a Request Message requesting execution of a requested service, Callback Server N340 creates a thread to execute the requested service at the execution rate demanded by the Request Message and sends back the results of the requested service to the application defined by the destination address. The results are sent in the form of a Result Message using UDP sockets. For example, Result Message can be sent to User Application M110 running on Machine M (M10).

The Request Message may be emitted from a user application running on a machine outside Platform P10, for example by User Application L110 running on Machine L (L10). In the preferred embodiment of the present invention, the Request Message is first sent to Intermed Server K120 using UDP sockets. In this case, the Request Message is directly forwarded by Intermed Server K120 to Callback Server N340.

As described above, a user application which needs information, for example User Application L110 running on the node L10, sends a Request Message to Intermed Server K120, whatever the type of the requested information is. In response to the requested information type, Intermed Server K120 is able to process the Request Message by forwarding it to Callback Server N340 or by retrieving information from Concentrator K110.

It should be noted that Intermed Server K120 acts as an intermediate server between Concentrator K110 or Callback Server N340 and User Application L110 running on Machine L (L10) outside of Platform P10.

By communicating with Intermed Server K120 rather than directly communicating with Callback Server N340, the requesting user application, for example User Application L110, only needs one interface to request statistical information, or statistical system information.

The network configuration described herein provides an access point for the requesting user application, no matter the type of requested information.

Figure 3:
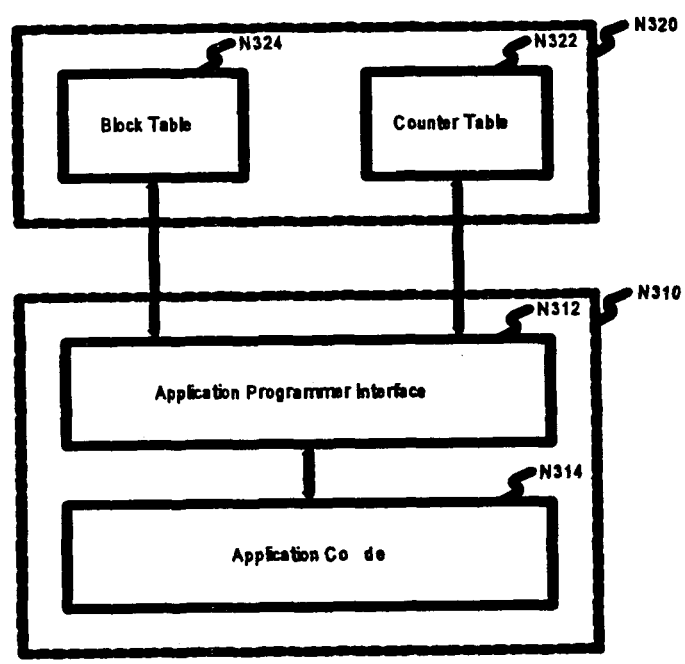
FIG. 3 is an exemplary schematic illustrating with more details an element of FIG. 2.

FIG. 3 is a schematic illustrating in more details the gathering of information from the Application N310 by Statistic Server N320. Statistic Server N320 maintains a Global Counter Table N322 capable of storing information related to Application N310. An entry in Global Counter Table N322, i.e., a Counter, holds information including a Counter Name and a Counter Value.

Statistic Server N320 further maintains a Global Block Table N324 capable of storing information related to Application N310. An entry in Global Block Table N324, i.e., a Block, holds information including a Block Name, a Begin Block Time Value and an End Block Time Value, as well as a Block Count Value.

Statistic Server N320 also provides an Application Program Interface (API) N312 allowing to retrieve and store Counter and Block information in Global Counter N322 and Block N324 Tables, respectively. By inserting the appropriate API call in Application Code N314 running on Node i N30, Statistic Server N320 can retrieve the Block and Counter information automatically.

A Block, or Counter, is first declared in Application Code N314 via the appropriate API N314 call, i.e., a call of an API N314 function.

Appendix 1 illustrates the API call to create a Counter in Global Counter Table N322. As can be seen in Appendix 1, the creation of a Counter is done by a call of the CreateCounter_rpc( ) function of a statiseurApi.H library. The statiseurApi.H library gathers the functions provided by API N314. The CreateCounter_rpc ( ) function needs three arguments, among which:

The name argument is used to identify a particular counter, i.e., the name argument define the Counter Name. In this embodiment, it must be noted that names are unique to the Statistic Server and thus global counters will share the same name. It must also be noted that, in this embodiment, Counter Name is given by the Application N310.

The initvalue argument allows the Counter Value to be set to a specific value upon creation of the Counter. By default this value is 0.

The CreateCounter_rpc ( ) function is programmed to return an handle to the created Counter, e.g., counthdl that can be stored in a variable.

Appendix 2 illustrates the appropriate API call to create a Block in the Global Block Table N324 of Statistic Server N320. The creation is done by the call of the CreateBlock_rpc ( ) function of the statiseurApi.H library. The CreateBlock_rpc ( ) function requires two arguments, among which:

The name argument is used to identify a particular Block, i.e., the name argument is stored in Global Block Table N324 as Block Name. In this embodiment, the names are unique to the Statistic Server and thus global blocks will share the same name. It must also be noted that, in this embodiment, Block Name is given by the Application N310.

The type argument define the type of the created Block. The different types of blocks would be disclosed further in the present description.

The CreateBlock_rpc ( ) function is programmed to return an handle, e.g., blockhdl, to the created Block that can be stored in a variable.

These API calls use the Remote Procedure Call Protocol (also known as RPC protocol) to communicate with Statistic Server N320 that a Block, or Counter, has been declared. The Statistic Server then dynamically adds a Block, or Counter, Table entry to Global Block N324, or Counter N322, Table respectively. This entry holds information including Block Name, or Counter Name, and the current Begin and End Block Time values as well as the Block Count value, or Counter value.

Once a Block or a Counter has been declared, data can be stored by the Application N310, i.e., data related to Blocks and Counters can be filled or updated. This is also done via calls of API N314 functions. The API calls to update a Counter or Block uses shared memory (SHM) to do so.

Appendix 3 illustrates a Counter Value update. Update is done via a call to the SetCountValue ( ) function of the statiseurApi.H library. This function requires three arguments, among which:

The counthdl argument is the handle to the counter returned by the CreateCounter_rpc ( ) function upon its creation as explained above.

The value argument is the value to be added to the Counter, i.e., an input value.

The operat argument determines how the input value is added to the Counter. It has three possible values. These are:

ASSIGN_OP, the Counter Value will be equal to the input value.

PLUS_AS_OP, the input value will be augmented to the current Counter Value.

MINUS_AS_OP, the input value will be subtracted from the current Counter Value.

A Block has two API calls that define a Starting Point and an End Point of a block of code. These API calls are shown in Appendix 4.

The Starting Point of a Block is defined using the SetBlockBegin ( ) function, which requires two arguments among which:

The blockhdl argument is the handle to the Block to be updated. As explained above, this handle was returned when the Block was created.

The tv argument takes in a time value and sets the Begin Block Time Value to this time value. This argument can be NULL. In such circumstances the function gets the machine time when the API is called and fills the Begin Block Time Value Block with this time.

The End Point of a block is defined using the SetBlockEnd ( ) function, which requires the same arguments as the SetBlockBegin ( ) function. The SetBlockEnd ( ) function will fill the End Block Time Value with the value of tv argument provided by the SetBlockEnd ( ) function.

When an application passes the Starting Point of the Block, and executes the Block of code until the End Point, statistical data is collected.

An example is shown in Appendix 5, which represents a piece of an application code. In this appendix the expression program code; represents any instructions to be executed by the Computer Platform P10.

The Instruction:

my_block=

CreateBlock_rpc ("search func", DEFAULT BLOCK TYPE); create a new Block, which name is search_func. As explained above, the CreateBlock_rpc ( ) function returns an handle to the new created Block. This handle is stored in a variable my block, that will identify this block in the next calls.

The instructions SetBlockBegin(my_block,NULL); and SetBlockEnd (my_Block, NULL); respectively define a Starting Point and an End Point for this Block. Calling the SetBlockBegin ( ) function will keep, e.g., in the Statistic Server the timestamp of the beginning of the block execution whereas calling the SetBlockEnd will keep the time of execution of that block, as well as update the number of times this block was executed, i.e., the Block Count Value.

This will produce as statistical information the time needed to execute the instructions placed between the SetBlockBegin ( ) and SetBlockEnd ( ) functions calls and how many times this piece of code was executed.

As explained above the type argument of the CreateBlock_rpc ( ) function may take different values, which are:

DEFAULT_BLOCK_TYPE is the default type and is typically used for gathering profiling information on an application running locally on one node.

CLEAN_ENTRY_BLOCK_TYPE is used to have an initialized Block every time the Block is created by an application. Thus, every time the CreateBlock_rpc ( ) function is called, the Block is initialized. Using such a Block Type allows an application to repeatedly capture statistical information, each time using the same Block. Thus, comparisons can be made on this statistical data on each run. Otherwise the results would be compounded together after each run. This is the case when the DEFAULT_BLOCK_TYPE is used.

CLEAN_TIME_AT_BEGIN is used to have the time reset every time the Block is used. Thus, every time an application uses the SetBlockBegin ( ) the Block time is initialized.

CHECK_POINT_BLOCK_TYPE_E is a particular type of Block that uses Checkpoints to store and retrieve the values related to a Block. Checkpoints allow a value of a Block to be used by other applications on other nodes even if the node initially setting the Block value has rebooted. This allows the ability to gather statistical information between two applications running on different nodes. This type of Block can be used to capture the time to switch from one node to another. For example, an application running on a Primary Node, e.g., Node 1 N10, stores a Time Value and then reboots the entire node, causing a Secondary Node, e.g., Node 2 N20 to become Primary. The application running on this node will then take another time value. The difference would be the time taken to carry out a switchover.

CHECK_POINT_BLOCK_TYPE_BE is similar to CHECK_POINT_BLOCK_TYPE_E, but can be used to continually carry out switchovers between two nodes on the Platform P10, and gather statistical information on these switchovers.

The different values for the type argument of the function allow the SetBlockBegin ( ) and SetBlockEnd ( ) functions to be called on different programs on different nodes. This is very interesting for High Availability Platforms, e.g., Platform P10 that have features related with switchover and failover. These features allow an application to take the hand of a task realized by another application. In this case, it is meaningful to know how much time is needed to switch or fail over the task. This means that the SetBlockBegin ( ) and SetBlockEnd ( ) functions calls may be done in two different applications.

In this embodiment, it should be noted that Blocks and Counters are global, and are distributed between processes running either on the same node, for example, Node i N30, or different nodes, for example, Node i N30 and the Node 1 N10, on Platform P10. It is therefore possible for a process running on one node to update a Block or Counter that was created on another node. When, for example, two processes create a Counter with the same Counter Name and then start updating the Counter Value of this Counter, the Statistics Server will only create one Counter and both processes will share the same. This is the case, even if the two processes are on different Nodes.

It must be noted that the actual value stored within the Counter or Block on the Concentrator may be different from the value intended by the user. This may be due to the fact that the Counter or Block is global and is being used by other applications.

More operations can be added to the counters; e.g., multiply, divide, modulus, etc.

A name policy could be implemented for the naming of Blocks and Counters. This policy should allow to maintain unique names even if two different Applications use the same name, i.e., Counter Name or Block Name. At the same time this policy should be optional. An application should be able to choose when a Counter Name (or Block Name) should be unique or not. Thus, Counters and/or Blocks might be shared, or not, by different Applications on different Nodes.

This invention encompasses software code, especially when made available on any appropriate computer-readable medium. The expression "computer-readable medium" includes a storage medium such as magnetic or optic, as well as a transmission medium such as a digital or analog signal. Such software code may include data and/or metadata.

This invention also encompasses the software code to be added to existing environments to perform any one of the various new functionalities, as described above, which may be used independently of each other.

On another hand, a number of features have been positively described, using absolute language, to help understanding the examples being described. Each such feature should be considered as exemplary only, and is not intended to restrict the scope of this invention in any way.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

Appendix 1
    #include <statiseurApi.H>
    int CreateCounter_rpc(int type, char *name, long initvalue);
Appendix 2
    #include <statiseurApi.H>
    int CreateBlock_rpc(char *name, int type);
Appendix 3
    #include <statiseurApi.H>
    int SetCountValue(int counthdl, int operat, long *value);
Appendix 4
    #include <statiseurApi.H>
    int SetBlockBegin(int blockhdl, struct timeval *tv);
    int SetBlockEnd(int blockhdl, struct timeval *tv);
Appendix 5
    program code;
    . . . .
    my_block=
    CreateBlock_rpc ("search func", DEFAULT_BLOCK_TYPE);
    program code;
    SetBlockBegin (my_block, NULL);
    program code;
    SetBlockEnd (my_Block, NULL);
    program code;
    . . . .

What is claimed is:

1. A networked computing system comprising:
a group of nodes in which each node of the group of nodes has a local statistic agent configured to maintain application-related statistical data on local execution in the node; and
a statistic tool comprising a processor and instructions stored in a memory, wherein, when executed by the processor, the instructions cause the statistic tool to implement:
a statistic manager for storing the application-related statistical data obtained from the group of nodes; and
a global statistic server for:
a) processing a first request from another computing system concerning the execution of an application by gathering, from the statistic manager, the application-related statistical data of at least a first node of the group of nodes which intervenes in the execution of the application; and
b) forwarding, to a callback server of at least the first node or another node of the group of nodes, a second request from the other computing system or a further computing system for statistical system information of the first node or the other node of the group of nodes, wherein the callback server sends the requested statistical system information to a destination address separate from the networked computing system.

2. The system of claim 1, wherein the statistic manager comprises:
a local statistic sender running on each node of the group of nodes and configured to retrieve the application-related statistical data from the local statistic agent of each node of the group of nodes; and
a global statistic collector for storing the application-related statistical data received from the local statistic senders of the group of nodes.

3. The system of claim 2, wherein the global statistic collector is configured to process a request from the global statistic server concerning the execution of the application by selecting from the application-related statistical data, data related to the application.

4. The system of claim 1, wherein the local statistic agent of each node of the group of nodes comprises:
a global statistical data table; and
an application program interface for interfacing with a software application executed in the node, wherein the application program interface comprises:
a data declaration function configured to create an identified data entry in the global statistical data table of each node by a call from the software application; and
a data update function, configured to set a value for the identified data entry in the global statistical data table of the node by a call from the software application.

5. The system of claim 1, wherein each node of the group of nodes comprises a respective callback server running thereon that is configured to process a request from the global statistic server by retrieving system-related statistical data on the node.

6. A method of monitoring a plurality of nodes on a platform of a networked computing system, the method comprising the steps of:
maintaining, by each node of the plurality of nodes of the platform configured through program instructions stored on a non-transitory computer-readable storage medium and executable by the node to operate as a statistical server, statistical data on local activity in the node;
storing, on a statistic manager in the networked computing system, the statistical data of the plurality of nodes;
receiving, at a global statistic server of the networked computing system, an incoming request from an application on a machine outside of the platform for the statistical data in relation to one of the plurality of nodes;
processing, by the global statistic server according to program instructions stored on the non-transitory computer-readable medium, the incoming request by retrieving the statistical data information from a global statistic collector of the networked computing system in response to the statistical data being stored on the global statistic collector, and sending the statistical data to a destination address associated with the application on the machine; and
forwarding, by the global statistic server according to program instructions stored on a computer-readable medium, the incoming request to a callback server of the one of the plurality of nodes in response to the statistical information not being stored on the global statistic collector, wherein the callback server sends the requested statistical system information to the destination address associated with the application on the machine.

7. The method of claim 6, wherein maintaining statistical data includes retrieving, by each node of the plurality of nodes configured through program instructions stored on the non-transitory computer-readable storage medium and executable by the node to operate as a local statistic sender, statistical data from the statistical server and wherein the storing step comprises centralizing the statistical data obtained from the plurality of nodes through cooperation with the local statistic senders of the plurality of nodes.

8. The method of claim 6, wherein maintaining statistical data includes gathering, by each node of the plurality of nodes, system-related statistical data on the node.

9. The method of claim 6, further comprising:

utilizing, by the application on the machine, the received statistical information to measure performance of the networked computing system.

10. A non-transitory computer-readable storage medium installable on a networked computing system, wherein the non-transitory computer-readable storage medium includes a set of instructions which operate as a statistic tool, which statistic tool includes:

a statistic manager configured to store centralized statistical data obtained from nodes running applications; and a global statistic server configured to:

a) process a first request from another computing system concerning the execution of an application by gathering, from the statistic manager, application-related statistical data of at least a first node of the nodes which intervenes in the execution of the application; and b) forward, to a callback server of at least the first node or another node of the nodes, a second request from the other computing system or a further computing system for statistical system information of the first node or the other node of the nodes, wherein the callback server sends the requested statistical system information to a destination address separate from the networked computing system.

11. A networked computing system comprising:

a group of nodes in which each node of the group of nodes has a statistic server configured to maintain application-related statistical data on local execution in the node; and a statistic tool comprising a processor and instructions stored in a memory, wherein, when executed by the processor, the instructions cause the statistic tool to implement:

a statistic manager for storing the application-related statistical data obtained from the group of nodes; and an intermediary server for:

a) processing a first request from another computing system concerning the execution of an application by gathering, from the statistic manager, the application-related statistical data of at least a first node of the group of nodes that intervenes in the execution of the application; and b) forwarding, to a callback server of at least the first node or another node of the group of nodes, a second request from the other computing system or a further computing system for statistical system information of the first node or the other node of the group of nodes.

12. The system of claim 11, wherein the statistic manager further includes:

a reporter running on each node of the group of nodes and configured to retrieve the application-related statistical data from the statistic server of each node of the group of nodes; and a concentrator for storing the application-related statistical data received from the reporters of the group of nodes.

13. The system of claim 12, wherein the concentrator is configured to process a request from the intermediary server concerning the execution of the application by selecting from the application-related statistical data, data related to the application.

14. The system of claim 11, wherein the statistic server of each node of the group of nodes further includes:

a global statistical data table; and an application program interface for interfacing with a software application executed in the node, wherein the application program interface comprises:

a data declaration function configured to create an identified data entry in the global statistical data table of each node by a call from the software application; and a data update function configured to set a value for the identified data entry in the global statistical data table of the node by a call from the software application.

15. A method of monitoring a plurality of nodes of a networked computing system, the method comprising the steps of:

maintaining, by each node of the plurality of nodes of the networked computing system configured through program instructions stored on a non-transitory computer-readable storage medium and executable by the node to operate as a statistical server, statistical data on local activity in the node;

storing, on a global statistic collector in the networked computing system, the statistical data of the plurality of nodes;

receiving, at an intermediary server of the networked computing system, an incoming request from another computing system for the statistical data in relation to one of the plurality of nodes; and forwarding, by the intermediary server according to program instructions stored on the non-transitory computer-readable medium, the incoming request to a callback server of the one of the plurality of nodes in response to the statistical information not being stored on the global statistic collector, wherein the callback server sends the requested statistical system information to a destination address separate from the networked computing system.

16. The method of claim 15, wherein maintaining statistical data includes retrieving, by each node of the plurality of nodes configured through program instructions stored on the non-transitory computer-readable storage medium and executable by the node to operate as a reporter, statistical data from the statistical server and wherein the storing step comprises centralizing the statistical data obtained from the plurality of nodes through cooperation with the local statistic senders of the plurality of nodes.

17. The method of claim 16, wherein maintaining statistical data includes gathering, by each node of the plurality of nodes, system-related statistical data on the node.

18. A non-transitory computer readable storage medium, installable on a networked computing system wherein the non-transitory computer-readable storage medium includes a set of instructions which when executed by the processor of the computing system operate as a statistic tool comprising:

a statistic manager configured to store centralized statistical data obtained from nodes running applications; and an intermediary server configured to:

a) process a first request from another computing system concerning the execution of an application by gathering, from the statistic manager, centralized statistical data of at least a first node of the nodes that intervenes in the execution of the application; and b) forward, to a callback server of at least the first node or another node of the nodes, a second request from the other computing system or a further computing system for statistical system information of the first node or the other node of the nodes, wherein the callback server sends the requested statistical system information to a destination address separate from the networked computing system.

19. A networked computing system comprising:
a group of nodes in which each node of the group of nodes has a local statistic agent configured to maintain application-related statistical data on local execution in the node; and
a statistic tool comprising a processor and instructions stored in a memory, wherein, when executed by the processor, the instructions cause the statistic tool to implement:
   a statistic manager for storing centralized statistical data obtained from the group of nodes; and
   an intermediary server for forwarding, to a callback server of at least one of the group of nodes, a request from another computing system for statistical system information of the one of the group of nodes, wherein the callback server sends the requested statistical system information to a destination address separate from the networked computing system.

20. A method of monitoring a plurality of nodes of a networked computing system, the method comprising the steps of:

maintaining, by each node of the plurality of nodes of the networked computing system configured through program instructions stored on a non-transitory computer-readable storage medium and executable by the node to operate as a statistical server, statistical data on local activity in the node;

storing, on a statistic manager in the networked computing system, centralized statistical data obtained from the plurality of nodes;

receiving, at a global statistic server of the networked computing system, an incoming request from another computing system for statistical information in relation to one of the plurality of nodes; and forwarding, by the global statistic server according to program instructions stored on the non-transitory computer-readable medium, the incoming request to a callback server of the one of the plurality of nodes, wherein the callback server sends the requested statistical system information to a destination address separate from the networked computing system.

* * * * *

UNITED STATES PATENT AND TRADEMARK OFFICE
CERTIFICATE OF CORRECTION

PATENT NO.         : 8,856,309 B1
APPLICATION NO.    : 11/081633
DATED              : October 7, 2014
INVENTOR(S)        : Vazquez et al.

Page 1 of 1

It is certified that error appears in the above-identified patent and that said Letters Patent is hereby corrected as shown below:

In The Specification

In column 2, line 58, delete "N20" and insert -- N20, --, therefor.

Signed and Sealed this
Twenty-eighth Day of April, 2015

Michelle K. Lee
*Director of the United States Patent and Trademark Office*